United States Patent [19]
Arnold

[11] 3,842,612
[45] Oct. 22, 1974

[54] PIPELINE RECOVERY TOOL AND METHOD

[75] Inventor: James Flinnoy Arnold, Houston, Tex.

[73] Assignee: Hydrotech International Inc., Houston, Tex.

[22] Filed: Sept. 20, 1972

[21] Appl. No.: 290,455

[52] U.S. Cl. .................. 61/72.1, 138/89, 166/.6, 285/18, 285/24, 285/315, 294/93
[51] Int. Cl. .......................... F16l 1/00, F16l 35/00
[58] Field of Search ........ 61/72.3, 72.1, 63; 285/18, 285/24, 315, DIG. 21; 138/89; 294/93, 94, 95, 96; 166/.6

[56] References Cited
UNITED STATES PATENTS

| | | | |
|---|---|---|---|
| 2,962,096 | 11/1960 | Knox | 285/315 X |
| 3,393,926 | 7/1968 | Arnold | 285/18 |
| 3,525,226 | 8/1970 | McCarron | 61/72.3 |
| 3,695,633 | 10/1972 | Hanes | 285/18 |
| 3,713,675 | 1/1973 | White, Jr. | 285/18 |
| 3,751,932 | 8/1973 | Matthews, Jr. | 61/72.1 |

Primary Examiner—Jacob Shapiro

[57] ABSTRACT

An apparatus and method for closing the end of a pipe, such as a pipeline, and for raising and lowering the same in a body of water. The apparatus includes a housing arranged for generally co-axial connection to the end portion of the pipe. Gripping means and sealing means are supported between the housing and the pipe whereby the housing is sealingly and frictionally engaged with the pipe. The apparatus also includes means for actuating the sealing and gripping means in response to fluid pressure. The housing also has means for connecting a supporting line thereto whereby the pipe may be raised and lowered in a body of water. Certain embodiments of the invention may include means connected to the housing for supporting a pipeline pig for launching through the pipe and means for applying a pressurized fluid to force the pig from the housing along the pipe to thereby evacuate water or the like from the pipe so that the pipe may be more easily raised and lowered in the body of water.

11 Claims, 8 Drawing Figures

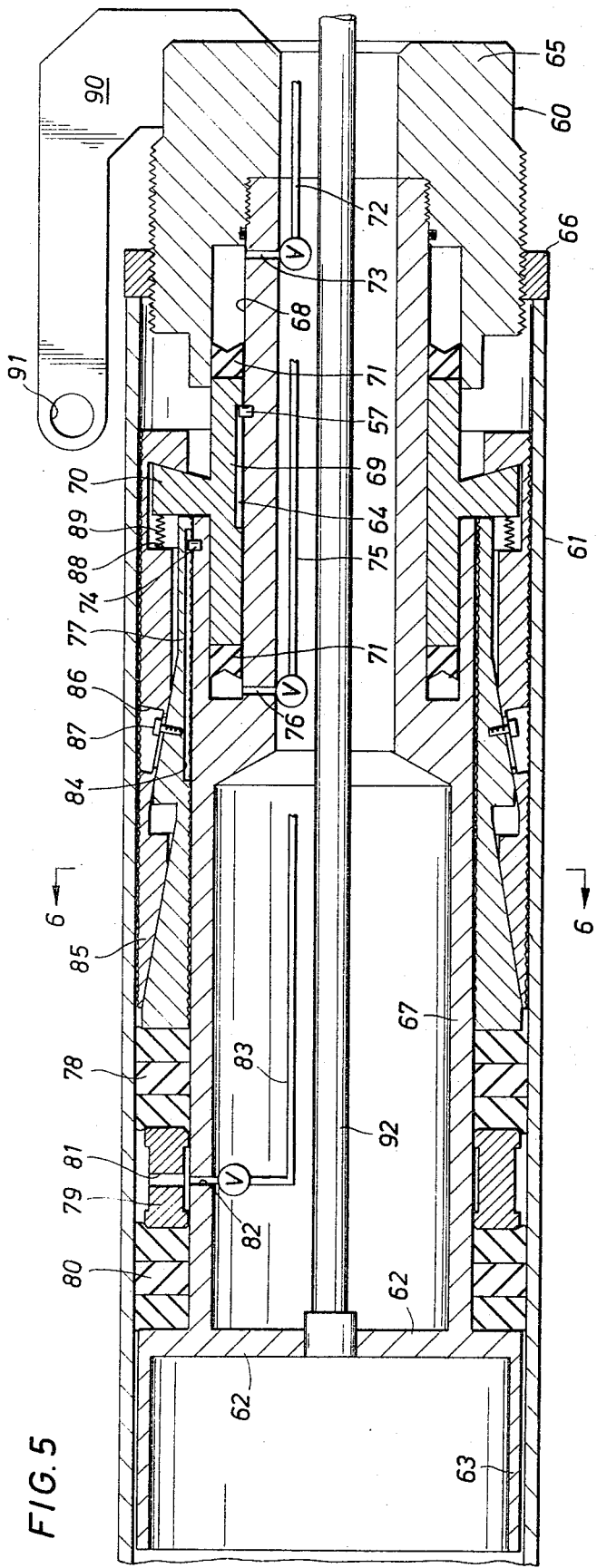
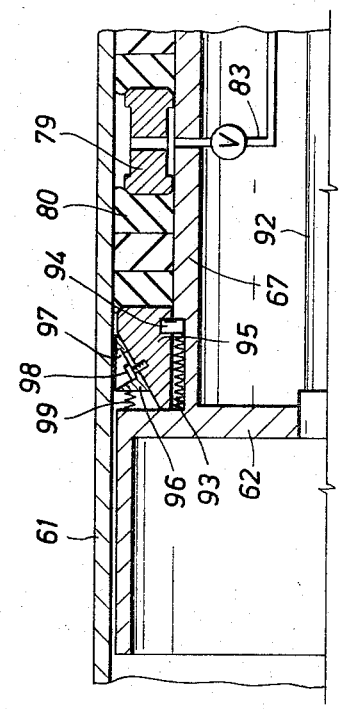
FIG. 5
FIG. 6
FIG. 7

PIPELINE RECOVERY TOOL AND METHOD

BACKGROUND OF THE INVENTION

1. Field of the Invention

This invention generally relates to a pipeline recovery tool and method. More particularly, this invention relates to a method and apparatus for making a connection to the end of a pipe, which pipe is to be raised and lowered in a body of water and which may be used to launch a pipeline pig to evacuate water or the like from the pipe.

2. Description of the Prior Art

During the laying of a pipeline along the sea bottom or the like, it is a usual practice to lay a section of pipe in a horizontal position on the floor of the sea bottom or the like while holding the end thereabout above the level of the water while at the same time maintaining sufficient tension on the pipeline so as to avoid kinking or bending of the pipeline. The end of the pipeline which is held above the water may then be operated upon to either weld or otherwise attach additional sections of pipe. This type of pipe laying method is well developed and well known in the art. However, it sometimes becomes desirable to terminate pipe laying operations for various reasons, in which event the end of the pipeline may be lowered to the sea bottom and allowed to remain there until the pipe laying operations are to be resumed. However, when pipe laying operations are again to be resumed there is a problem in recovering the end of the pipeline so that it may be properly raised to the work position, as for example, on top of a pipe laying barge or the like. Moreover, the pipeline which has remained in the water will itself become filled with water, thereby increasing the difficulty of raising the end of the pipeline for the resumption of pipe laying operations.

There has thus developed a need for a pipeline plug or the like which can be connected to the end of a pipeline and which can be used for raising and lowering the end of the pipeline in the body of water so that the pipeline can subsequently be recovered and the pipe laying operations commenced.

Prior art devices have been developed for connection to the end of a pipeline and for supporting or connecting a supporting line thereto. However, these prior art devices have not sealed the pipeline to prevent incursion of water thereto and did not include means for evacuating water from the pipeline which may have accumulated therein. The present prior art method of combating this problem is to provide a "nitecap" for a pipeline by welding a plug with a lifting eye on the end and lowering the same to the bottom of the water with a lifting line and buoy attached thereto. This, of course, is expensive due to welding and loss of time of the lay barge and crew. In addition, it is very difficult and time consuming to cut the plug off.

SUMMARY OF THE INVENTION

It is therefore an object of this invention to provide an improved pipeline recovery tool and method which apparatus and method is arranged for sealingly closing the end of a pipe and for raising and lowering the same in a body of water.

Briefly stated, the apparatus of this invention includes a housing arranged for generally co-axial connection to the end portion of the pipe. This connection may be either in the form of an internally fitting plug housing or an overfitting housing. Gripping means are supported by the housing between the housing and the pipe for frictionally engaging the pipe upon actuation thereof. Sealing means are also supported by the housing between the housing and the pipe for sealing the annular space therebetween, with the seal means being cooperative with the housing for sealing and closing the pipe end upon actuation thereof. Means are supported by the housing for actuating the gripping and seal means in response to the application of fluid pressure thereto. The apparatus includes means connected to the housing for attaching a supporting line thereto whereby the pipe end may be raised and lowered in the body of water by taking in and paying out on the line. Certain embodiments of the invention may include means connected to the housing for supporting a pipeline pig or the like for launching through the pipe. These embodiments include means for applying a pressurized fluid to force the pig from the pipe supporting means and along the pipe to thereby evacuate water or the like from the pipe.

Briefly stated, the method of this invention generally includes supporting a housing generally co-axially proximate the end of the portion of the pipe which is to be raised or lowered in a body of water. It also includes the step of supporting pipe gripping means between the housing and the pipe and also supporting seal means between the housing and the pipe with the seal means being cooperative with the housing for closing the pipe end upon actuation thereof. Thereafter, the gripping and seal means are actuated to gripping and sealing positions by applying a fluid actuated force thereto whereby the housing is sealingly and frictionally connected to the pipe. The method also includes connecting a supporting line to the housing whereby the pipe end may be lowered and raised in the body of water by paying out and taking in the line. The method may also include the step of supporting a pipeline pig or the like in the housing and applying a pressurized fluid to the housing to thereby propel the pig from the housing along the pipe to thereby evacuate water or the like from the pipe.

BRIEF DESCRIPTION OF THE DRAWINGS

FIG. 5 is generally a central sectional view of an alternative embodiment of the invention.

FIG. 6 is a cross sectional view generally taken along line 6—6 of FIG. 5.

FIG. 7 is a fragmentary central sectional view of a further alternate embodiment of the invention.

DESCRIPTION OF THE PREFERRED EMBODIMENTS

Figure 1:
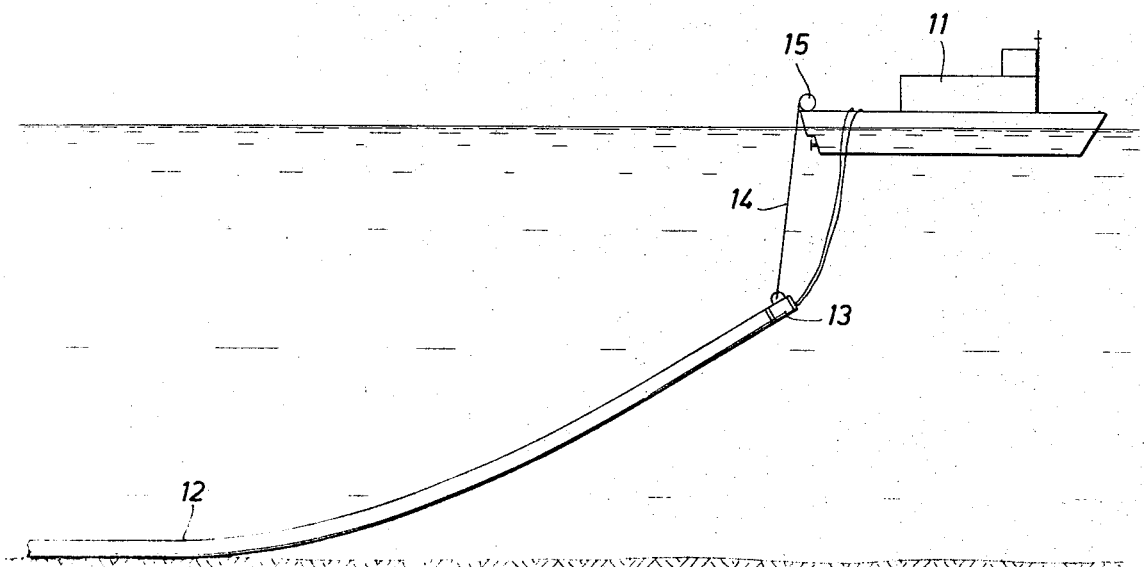
FIG. 1 is a generally schematic view of a pipeline laying operation showing the end of the pipeline being raised or lowered in a body of water by use of the apparatus and method disclosed herein.

Referring now to FIG. 1, a pipe laying barge 11 is shown in a body of water along the bottom of which a pipeline 12 is being laid and having the end thereof either being raised or lowered by use of the present apparatus and method. The end of pipeline 12 is shown being supported in the body of water by plug housing 13 which is connected to a cable 14 which is arranged for taking in and paying out by winch 15 mounted on barge 11. It will thus be seen that if it becomes desirable to terminate pipeline laying operations, plug housing 13 may be inserted in the end of pipeline 12 and lowered to the bottom of the sea by paying out cable 14. When cable 14 is fully paid-out, a bouy or the like may be attached thereto for subsequent recovery purposes and barge 11 may be free to go to shoreside or otherwise carry on other operations. When it becomes desirable to recover pipeline 12 and raise the same in the body of water, winch 15 can once again be attached to cable 14 and pipeline 12 raised by taking up on cable 14. Certain embodiments of the present invention include a pig launching means included in the plug housing such that pipeline 12 can be evacuated of water or other fluids to thereby facilitate the raising of pipeline 12.

Figure 2:
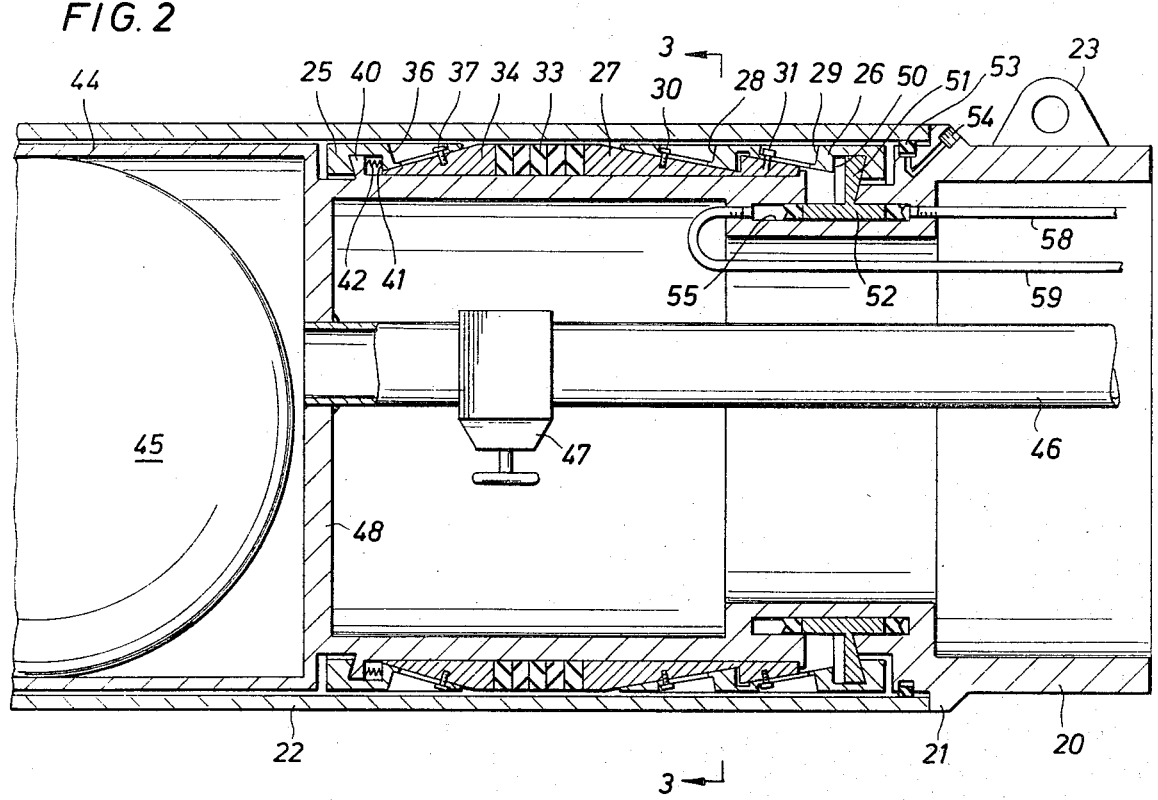
FIG. 2 is generally a central sectional view of one embodiment of the invention, showing the device in the unactuated condition.

Referring now to FIG. 2, one form of the apparatus will be described, which form is in the nature of a plug which is arranged for insertion into the end of a pipe in co-axial alignment therewith and for frictionally and sealingly engaging the same. This embodiment includes a plug housing 20 which is generally tubular in shape and is provided with an external abutting flange 21 which is arranged for initially abutting against the end of pipe 22 to which the connection is to be made and which pipe is to be closed. Plug housing 20 is provided with a lifting eye 23 on the top side thereof by which cable 14, shown in FIG. 1, may be attached thereto. For purposes of convenience, the left end of plug housing 20 may sometimes be referred to as the rearward end and the right end as viewed in FIG. 2 may sometimes be referred to as the forward end. Plug housing 20 supports gripping means for frictionally engaging the inside of pipe 22 and conveniently takes the form of a first plurality of segmented circumferentially spaced rearward slips 25 and a second plurality of segmented circumferentially spaced forward slips 26. Slips 26 are provided with gripping teeth on the radially outward side thereof, and a pair of tapered camming surfaces on the radially inward side thereof, which camming surfaces are arranged for engaging mating camming surfaces of a thrust member in the form of forward annular bowl 27. Each of the slips 26 has a pair of longitudinally extending slot recesses 28 and 29 extending in from the radial outward side thereof, in which are respectively mounted slip retainer bolts 30 and 31 and which are threaded into forward bowl 27 such that slips 26 may move axially with respect thereto and thereby be cammed radially outwardly to the gripping position with the internal surface of pipe 22 as shown in FIG. 4.

This embodiment of the invention also includes seal means in the form of a plurality of resilient radially deformable packing rings 33 of neoprene or the like which are arranged for sealingly engaging between plug housing 20 and the inside of pipe 22 in response to the application of axial pressure thereto. The rearward packing ring 33 abuts against an annular rearward bowl 34 which is mounted about plug housing 20 for axially sliding movement with respect thereto. The radially outward side of bowl 34 is tapered radially inwardly as shown, and supports a plurality of segmented rear slips 25 as shown.

Rear slips 25 are each provided with a longitudinal recess slot 36 through which is mounted slip retainer bolts 37, such that tapered slips 25 may slide axially relative to bowl 34 and thereby be cammed radially outwardly into engagement with the internal surface of pipe 22. Slips 25 are provided with teeth on the radially outward side thereof to improve the frictional grip when engaged.

Figure 4:
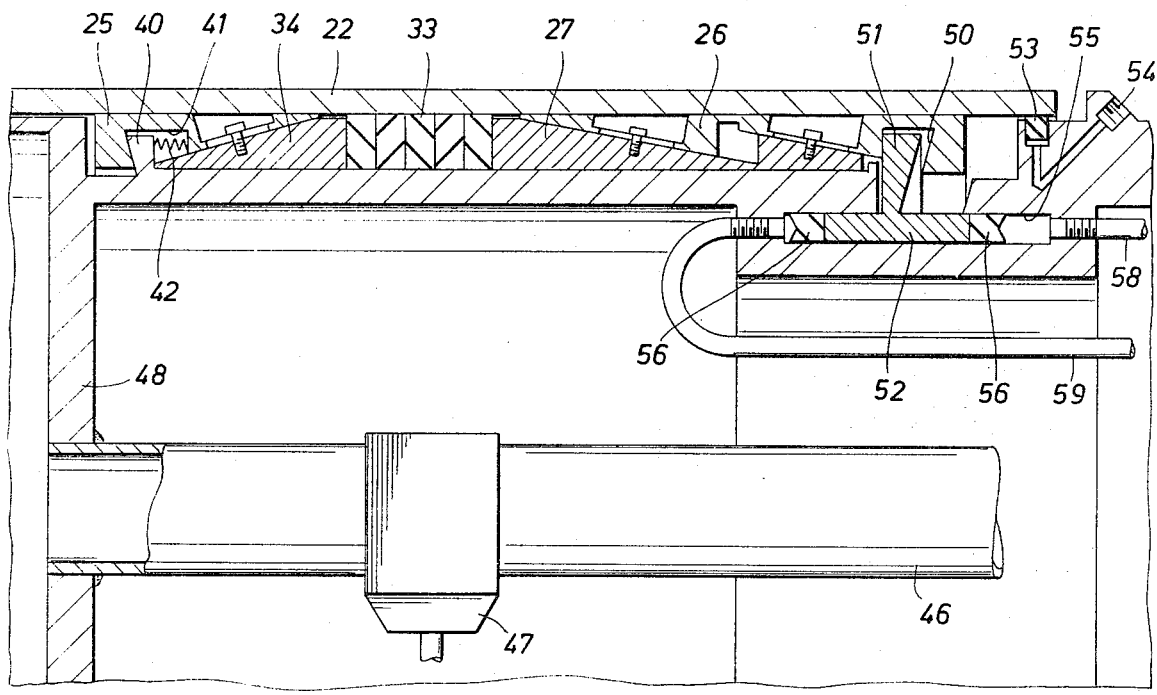
FIG. 4 is a fragmentary and enlarged view of the apparatus shown in FIG. 2, but with the device in the actuated condition.

Near the rearward end thereof, plug housing 20 is provided with an annular flange thereabout forming a body lug 40 which is arranged for mounting in a transversely extending recess 41 on the radially inward side of each of the slips 25, as is best shown in FIG. 4. The rearward side of each of the recesses 41 is tapered to match lug 40 to thereby provide a camming action to unseat slips 25 in releasing the tool from the set position.

Each of the recesses 41 has mounted therein a spring 42 which generally urges each of the slips 25 to the seating position as shown in FIG. 4.

The rearward or left end of plug housing 20 is provided with a tubular extension 44 which is arranged for supporting and housing a spherical pipeline pig 45 of conventional design which is arranged for propelling through the pipeline once the connection is made. Means are also provided in the housing for applying fluid pressure to pig 45, which means are in the form of a pressure pipe 46 which communicates with the chamber in which pig 45 is initially housed through end wall 48 and through which pressure application is arranged for control by valve 47. It is to be understood that pig 45 can take many different configurations — for example, a cylindrical member. Further, for purposes of this application, the term "pig" is construed to cover any object which may be propelled through the pipeline by use of the apparatus and method taught herein. Pipe 46 may also be used to inject helium gas, or the like into the pipeline, as desired.

Each of the forward segmented slips 26 is also provided with a radially inwardly facing and transversely extending generally U-shaped recess 50, having the back wall tapered and which recess is arranged for receiving a radially extending piston flange 51 which is attached to the outside portion of tubular shaped setting piston 52. It will be noted that the forward or right edge of flange 51 is tapered in a manner similar to the forward or right side of recesses 50 so as to provide a positive camming action for moving slips 26 away from engagement with the inside of pipe 22.

Setting piston 52 is mounted in an annular chamber 55 provided in housing 20 as shown, and has mounted on each axial end thereof an annular resilient sealing ring 56 of rubber or the like. The forward or right end of chamber 55 is communicated with through setting pressure line 58 and the rearward or left end of chamber 55 is communicated with by unsetting pressure line 59.

Figure 3:
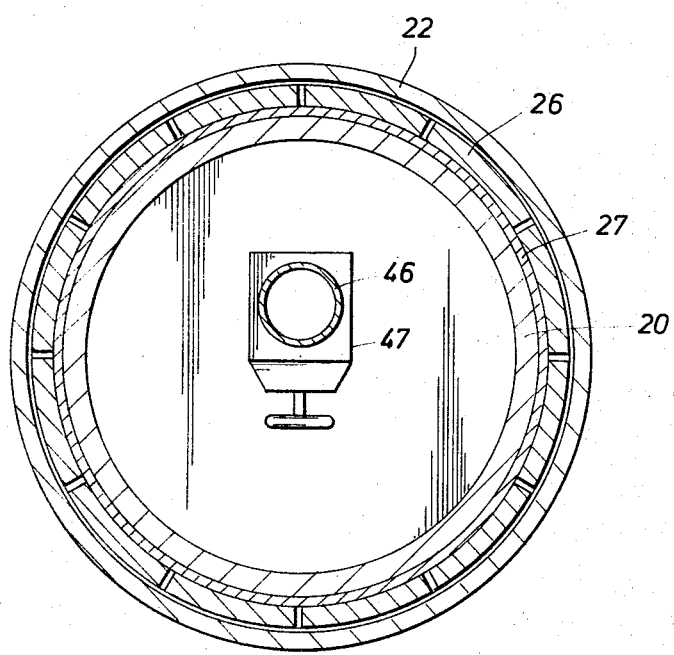
FIG. 3 is generally a cross sectional view taken along line 3—3 of FIG. 2.

In operation of the embodiments shown in FIGS. 2, 3, and 4, plug housing 20 is initially placed in and supported in the end of pipe 22 in the manner shown with pig 45 being supported by tubular extension 44 of housing 20. Flange 21 is initially abutted against the end of pipe 22 as shown in FIG. 2. The apparatus is actuated to the setting position by applying hydraulic pressure on line 58 which causes setting piston 52 to move rearward or to the left as viewed in FIGS. 2 and 4. Upon contact of piston flange 51 with slips 26, they are carried forward or to the left along with forward bowl 27, packing rings 33, rear bowl 34, and rear slips 25, until rear bowl 34 seats against body lug 40. As setting piston 52 thereafter continues to move forward or to the left, as viewed in FIGS. 2 and 4, slips 26 are cammed radially outward toward the inner wall of pipe 22 until the same are wedged and no further movement of slips 26 is possible.

Continued application of hydraulic pressure on setting line 58 causes the entire plug housing 20 to move outward or axially to the right as shown in FIG. 4. Body lug 40 applies axial force to rear bowl 34 causing pressure and sealing of packing rings 33 creating a pressure seal. During the squeezing of packing rings 33, rear slips 25 are kept in proximate contact with the inside surface of pipe 22 by action of springs 42.

When outward or axial movement of plug housing 20 to the right ceases, the compressed packing rings 33 exert axial pressure on rear bowl 34, which in combination with springs 42, causes locking of slips 25 in the engaged position. Hence, the apparatus is locked in pipe 22 without the necessity for continuation of applied pressure. Thus mounted as shown in FIG. 4, the end of pipe 22 may be picked up by attaching an appropriate cable to lifting eye 23 and lifting thereon. Hence, the pipe 22 may be raised or lowered in a body of water by picking up or paying out on such cables. The tension which will be exerted between plug housing 20 and pipe 22 by lifting on plug housing 20 creates a continuation of the conditions which came into existence during the actuating or setting step and thereby insures continued engagement of plug housing 20 in pipe 22.

In certain embodiments of the apparatus, it is desirable to have seal means provided between housing 20 and pipe 22 which will prevent incursion of water into the area of operation of the slips 26 and bowl 27. These means can conveniently take the form of an annular seal 53 mounted in a radially outwardly facing recess adjacent the flange 21. Hence, upon insertion of the tool in the pipe 22, hydraulic pressure or other fluid pressure is applied through inlet 54 to cause annular seal 53 to seal off the space rearwardly thereof and to remain sealed during periods when the plug is left inserted in pipe 22.

When it becomes necessary or desirable to remove plug housing 20 from engagement with pipe 22, hydraulic pressure is relieved through inlet 54 and applied through line 59 to thereby urge setting piston 52 axially forward or to the right as shown in FIGS. 2 and 4, relative to housing 20. Continued application of hydraulic pressure on line 59 causes flange 51 to engage the rearward side of recesses 50 of slips 26, thereby resulting in the movement of plug housing 20 and body lug 40 rearward or to the left, causing rear slips 25 to unseat.

Unseating of rear slips 25 allows packing rings 33 to expand and relieve outward pressure on forward bowl 27, which thereby frees forward slips 26 so that they may then be moved forward and unseated by piston flange 51. At this point, plug housing 20 may be freely removed from pipe 22.

In those instances when it is desirable to evacuate water or other fluids from pipe 22 during the lifting on lifting eye 23 as aforesaid, pressure may be applied through pressure pipe 46 which thereby forces pig 45 from tubular extension 44 and pig 45 thereafter forces any water or fluids ahead thereof from pipe 22, thereby reducing the weight of pipe 22 so that it may be more readily raised in a body of water, for example.

Referring now to FIGS. 5 and 6, an alternate embodiment of the apparatus of this invention will be described. Plug body 60, which is generally cylindrical, is shown mounted inside of the end of pipe 61 in the set condition. The rearward or left end of plug body 60 is provided with an end wall 62 which is connected to tubular pig launching tube 63, in which may be supported a pipeline pig (not shown) of conventional type which is arranged for launching through the pipe 61 for removing water therefrom as will be explained hereinafter. As with the previous embodiment, the pig may take various configurations, and tha term is used to cover any type of apparatus which might be launched through the pipeline by use of the method and apparatus taught herein.

Plug body 60 is provided with a base portion 65 which is provided with external threads throughout on which is threaded jam ring 66. Base portion 65 is also provided with internal threads by which the same is threadably connected to forward portion 67 which supports the sealing and gripping means which will be described hereinafter. Base portion 65 and forward portion 67 of plug body 60 together form an annular chamber 68 in which is mounted for axial movement actuation piston 69, which has a radially outwardly extending compression flange 70 connected thereto. Each end of piston 69 has mounted adjacent thereto in annular chamber 68 an annular seal 71, each of which is provided with a V surface on the side opposite piston 69 for effecting sealing engagement in annular chamber 68. A hydraulic setting pressure line 72 communicates with annular chamber 68 through inlet 73 provided in body 60. In addition, hydraulic unsetting pressure line 75 communicates with the other end of annular chamber 68 through inlet 76. Hence, by the application of fluid pressure on line 72, piston 69 is moved to the setting position and upon application of fluid pressure on line 75, piston 69 is moved to the unsetting position.

The rearward or left side of flange 70 is arranged for engagement with a thrust member in the form of a generally tubular shaped split spear 77, having gripping teeth on the inside surface thereof and having two axially spaced apart tapered camming surfaces on the external surface thereof. The left or rearward end of spear 77 is arranged to abut against a plurality of packing rings 78, which in turn abut against a pressure testing ring 79, which in turn abuts against another plurality of packing rings 80 which abut against end wall 62. It is to be understood that packing rings 78 and 80 are of the resilient type, preferably of neoprene rubber or the like, and are engaged for radial deformation in response to axial compression such that they seal between plug body 60 and the internal surface of pipe 61.

Pressure testing ring 79 is provided with an annular recess on both the inside and outside diameter and a plurality of radially extending holes 81 therethrough. In addition, plug body 60 is provided with an inlet 82 which is positioned to be adjacent testing ring 79 in the actuated position. Inlet 82 is connected with pressure testing line 83 such that by application of hydraulic pressure or the like to line 83, the effectiveness of the seal provided by packing rings 78 and 80 can be tested.

Plug body 60 supports a plurality of segmented slips 85 having gripping teeth on the outside surface thereof and having two axially spaced apart tapered surfaces for engagement with and camming by the mating camming surfaces of spear 77. Each of the slips 85 is provided with a slot 86 which supports the head of a slip retainer bolt 87 which is threaded into spear 77 such that there can be relative axial movement between spear 77 and each of the slips 85.

In addition, each of the slips 85 has a transversely extending recess 88 toward the forward or right end thereof which is arranged to receive compression flange 70 as shown. The forward or right end of recess 88 is tapered to conform with the corresponding or mating tapered surface of compression flange 70 which facilitates unseating of the slips 85 as will be discussed hereinafter. In addition, a spring 89 is mounted between the rearward or left side of flange 70 and the rearward or left wall of recess 88 for urging slips 85 to the seating position as will be explained hereinafter. Plug body 60 also has attached at the forward or right end thereof a lifting arm 90 which is curved over the body of the tool and which is provided with a lifting eye 91 to provide improved balance for handling of the tool. Lifting eye 91 is arranged for connection to a lifting cable or the like.

End wall 62 is provided with an aperture therethrough, to which is connected pig launching pressure line 92 which may be used to apply a fluid pressure to pig launching tube 63 to project a pipeline pig or the like (not shown) therefrom in those instances in which it is desirable to evacuate water or other fluids from pipe 61, or to inject gas into the pipeline, as with the previous embodiment.

In certain embodiments of the invention it is desirable to have certain portions of the tool keyed together so as to insure proper operation thereof in all circumstances. Referring now to FIG. 5, piston 69 is keyed to forward portion 67 by means of a set screw 57 threaded into forward portion 67 and having the head thereof arranged for axial travel in key way 64 provided on the internal surface of piston 69. Similarly, spear 77 is keyed to forward portion 67 by means of set screw 74, the head of which is arranged for axial travel in key way 84 provided on the internal surface of spear 77. Having the parts thus keyed together, slips 85 are maintained parallel to the axis of the tool, such that springs 89 do not become dislocated, which might occur if there is relative rotation of the various parts.

In operation, the tool shown in FIGS. 5 and 6 is inserted into the end of a pipe such as pipe 61 in the manner shown. Hydraulic pressure is then applied through line 72, causing piston 69 to move to the left as shown in FIG. 5. Compression flange 70 engages split spear 77 which has the gripping teeth on the inside surfaces thereof. This compressive force causes packing rings 78 to move against pressure testing ring 79 which in turn moves against packing rings 80. Continued axial force causes packing rings 78 and 80 to become compressed and moved to a sealing position between the internal surface of pipe 61 and body 60, and additionally to contain a source of stored energy.

In moving rearwardly or to the left, as shown in FIG. 5, piston 69 and flange 70 compress springs 80, which in turn urge slips 85 to wedge against the inside surface of pipe 61. The wedging action of slips 85 also causes split spear 77 to compress circumferentially, thereby allowing or causing the teeth on the internal surface thereof to grip body 60. It is to be understood that forward portion 67 of body 60 may also be provided with annular teeth or threads thereabout to increase frictional engagement with spear 77. Hydraulic pressure may then be relieved on line 72 with the tool remaining locked in the set position as shown in FIG. 5. Threaded ring 66 may also be threaded up to abut against the end of pipe 61 as shown to prevent outside pressure from unsetting the tool.

Pressure may then be applied on pressure testing line 83 to thereby test the sealing condition of packing rings 78 and 80 as aforesaid to make sure that the tool is effectively sealing the end of pipe 61. Thus actuated, pipe 61 and the said plug body 60 may be lowered over the side of the barge to the bottom of the body of water by a conventional lifting line and buoy.

Further, the pipeline pig or the like which may be supported in pig launching tube 63 may also be launched by application of pressure through pressure line 92 to evacuate water or the like. This is most likely done in the event or at the time that pipe 61 is to be raised from the bottom to insure that fluids are evacuated from pipe 61 so that it may be more readily raised. Pressure line 92 may also be used to inject helium or other gases into the pipeline, in order to obtain improved bouyancy over compressed air, for example.

To remove plug body 60 from pipe 61, pressure will have been released on pressure lines 72 and 83 and hydraulic pressure is applied through line 75 causing piston 69 to move outwardly or to the right as shown in FIG. 5. This movement of piston 69 causes compression flange 70 to engage and withdraw slips 85 from the set positions at which point split spear 77 is free to expand outwardly and away from its gripping position with body 60. This releases the energy stored in packing rings 78 and 80, thus disengaging the seal means. At this point, plug body 60 may be removed from pipe 61 and pipe laying operations resumed.

Referring now to FIG. 7, a further alternate embodiment will be described, which embodiment is essentially the same as that shown in FIGS. 5 and 6 except that the FIG. 7 embodiment is provided with an additional plurality of setting slips and hence only a fragmentary portion of the tool is shown in FIG. 7. Except for these elements which are described in FIG. 7 as being different from those in the embodiment shown in FIGS. 5 and 6, all other portions of the tool are identical and the operations are identical. In the FIG. 7 embodiment, packing rings 80 are arranged to abut against a generally tubular floating spear 95 which is arranged to abut against end wall 62. Spear 95 is tapered about the outside surface thereof so as to provide a camming surface against which is supported a plurality of circumferentially spaced about slips 96 which have teeth on the outside surface thereof for gripping the inside of pipe 61. Each of the slips has a slot 97 through which is mounted a retaining bolt 98 which is threaded into spear 95 to maintain circumferential spacing thereof and to allow relative movement therebetween such that slips 96 may be actuated to engagement with the inside surface of pipe 61 by such relative axial movement theretogether. Each of the slips 96 is urged to the seating position by a spring 99 mounted between the end of each of the slips 96 and end wall 62 as shown.

Spear 95 is keyed to the forward portion 67 by means of set screw 94, which is arranged for travel in a key way provided in forward portion 67 and in which is mounted another compression spring 93. The keying arrangement keeps slips 96 axially aligned and thereby prevents any damage to springs 99 which might occur by any misalignment thereof. Spring 93 also acts to keep spear 95 pushed away from under slips 96 before the tool is set, thereby facilitating the locking and unlocking of spear 95 and slips 96.

This embodiment of the apparatus thereby provides engagement of the body 60 in gripping relationship with the internal surface of pipe 61 at two axially spaced apart points in the housing and thereby provides greater stability for the connection. In all other respects, the operation of the FIG. 7 embodiment is the same as the previously described embodiment.

Figure 8:
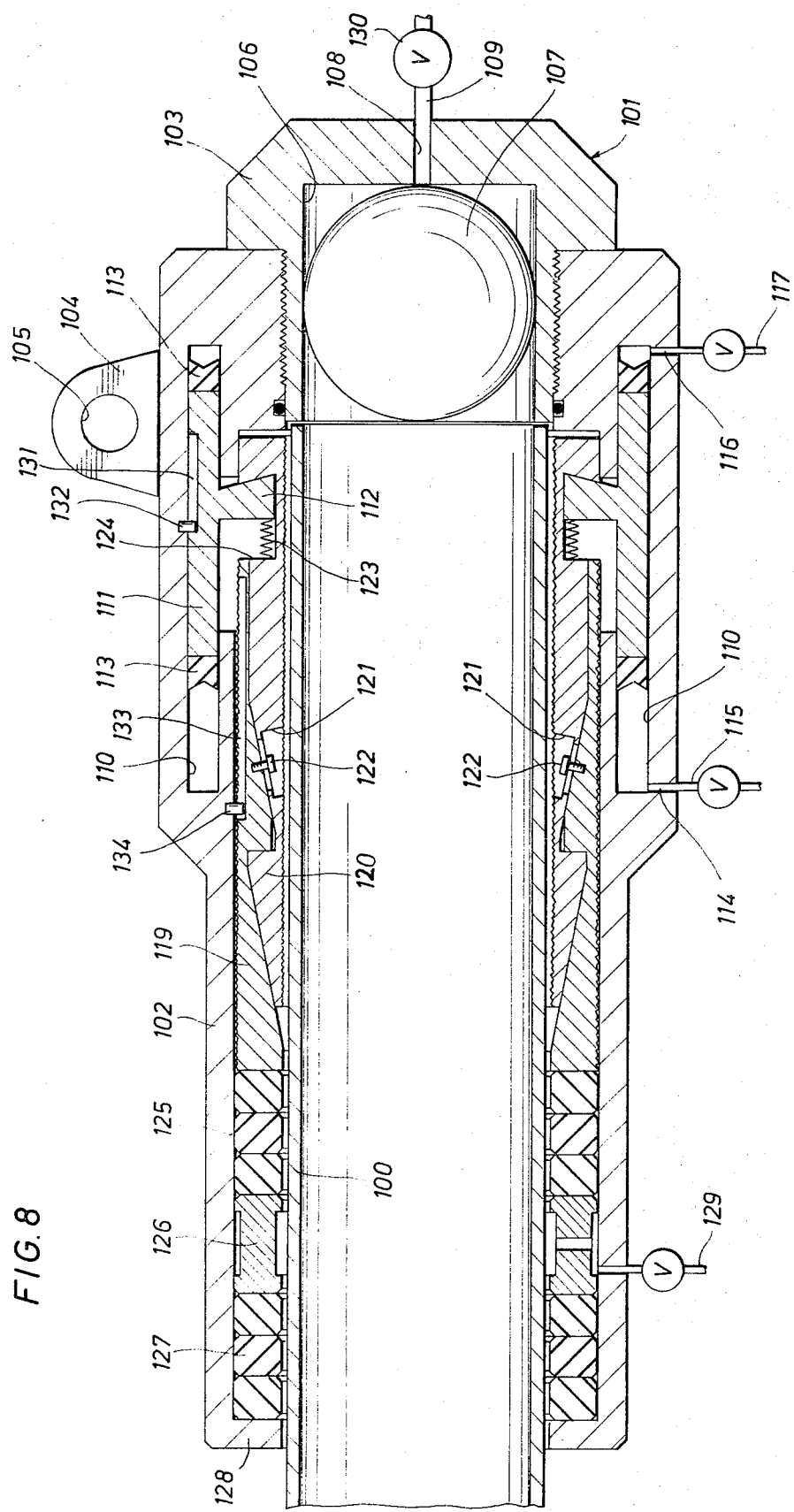
FIG. 8 is a generally central sectional view of an oversliding connector embodiment of the invention.

Referring now to FIG. 8, a still further alternate embodiment of the invention will be described, which is arranged for overfitting connection to the end of a pipe. The embodiment shown in FIG. 8 is similar to the previous embodiments except that it is adapted for engaging the outside surface of the end of a pipe, such as pipe 100. This embodiment may have certain advantages in certain situations where it is not possible to insert a plug in the inside of a pipe which is to be raised or lowered in a body of water. Nevertheless, the construction and operation of this embodiment is similar to the previous two embodiments. The housing of this apparatus is generally designated by the numeral 101 and includes a generally elongate tubular section 102 which is threadably connected to a base section 103. Section 102 has attached thereto on the upper side thereof, a lifting lug 104 provided with a lifting eye 105 by which a lifting cable or the like may be attached thereto. Tubular section 102 is arranged to fit about the outside surface of pipe 100 and the left or forward end of base section 103 is arranged for abutment against the end of pipe 100 as shown. Base section 103 is formed with a tubular pig launching cylinder 106 therein in which is shown mounted a pipeline pig 107. Means are provided for providing pressurized fluid to launch pig 107 along pipe 100 which means are in the form of an inlet 108 which communicates with pig launching pressure line 109.

Section 102 of housing 101 has formed therein an annular chamber 110 in which is mounted for axial sliding movement a generally tubular shaped piston 111 having a radially inwardly extending compression flange 112. Each axial end of piston 111 has abutted thereagainst a pressure seal 113 whereby a pressure chamber is formed in each end of annular chamber 110. Communication to the left or forward end of annular chamber 110 is provided by inlet 114 which communicates with unsetting pressure line 115. The forward or right end of annular chamber 110 is communicated with through inlet 116 which communicates with pressure setting line 117.

Compression flange 112 is arranged to abut against a thrust member in the form of tubular split spear 119 which is provided with gripping teeth about the external surface thereof which are arranged for gripping the internal portion of tubular section 102 upon actuation. The internal surface of section 102 may also be provided with annular grooves or threads to increase this frictional gripping action. The radially inward side of tubular spear 119 is provided with two axially spaced apart annular tapered portions which mate with similarly tapered portions of a plurality of segmented slips 120 which are circumferentially spaced thereabout. Each of the slips 120 is provided with a slot 121 which engages the head of a slip retainer bolt 122 which is threaded into spear 119 such that there can be relative movement between each of the slips 120 and spear 119 whereby the slips 120 may be cammed to the setting position upon relative axial movement therebetween. Each of the slips 120 is provided with a gripping surface in the form of teeth or the like on the radially inward side thereof for engaging the external surface of pipe 100.

Further, each of the slips 120 is provided with a transversely extending recess 124 on the right or outward end thereof as shown in FIG. 8, in which is received compression flange 112 as shown. A compression spring 123 is mounted in each of the aforesaid recesses 124 between the compression flange 112 and the forward wall of said recess 124 whereby slips 120 are urged to the seating position and engagement with pipe 100.

In the FIG. 8 embodiment of the tool, the various parts are also keyed together to prevent certain relative rotation therebetween. More particularly, piston 111 is keyed to section 102 by means of set screw 132 threaded into tubular section 102. The head of set screw 132 is arranged for axial travel in key way 131 provided on the external surface of piston 111. Similarly, spear 119 is keyed to tubular section 102 by means of set screw 134, also threaded into tubular section 102. The head screw 134 is arranged for axial travel in key way 133 provided on the external surface of spear 119.

In operation, the FIG. 8 embodiment is mounted over the end of pipe 100 as shown. Hydraulic pressure is thereafter applied through line 117 causing piston 111 to be moved rearwardly or to the left as shown in the drawing, carrying with it split spear 119. Spear 119 thereafter compresses packing rings 125 and shifts them axially rearward or to the left as shown in the drawing. Packing rings 125 thereafter cause pressure testing ring 126 to be moved to the left thereby compressing packing rings 127 against the end 128 of housing 101. Continued application of hydraulic pressure on line 117 causes packing rings 125 and 127 to be deformed into sealing engagement with pipe 100 and also to store energy by virtue of their being compressed.

As piston 111 moves to the left as shown in FIG. 8, springs 123 urge segmented slips 120 to wedge against the outside surface of pipe 100. The wedging action caused by slips 120 causes split spear 119 to open allowing the teeth on the outside diameter thereof to grip the inside of tubular section 102 of housing 101. In this position, the tool is locked and hydraulic pressure may then be relieved on line 117 and the tool will stay in the set position. At this point, pressure may be applied on hydraulic line 129 which thereby applies pressure around pressure testing ring 126 to thereby test the sealing of seal rings 125 and 127 as with the previous embodiment. If the seal is effective, pipe 100 along with plug housing 101 may be lowered over the side of the lay barge to the sea bottom and have a recovery line with a buoy attached thereto. At this point, or when it becomes desirable to retrieve the end of pipe 100, pig 107 may be launched through pipe 100 by the application of pressure on line 109 to force pig 107 along pipe 100 to evacuate water or the like therefrom. This pig launching procedure will evacuate fluids that may have encroached into pipe 100 and thereby make the same easier to raise or lower in a body of water.

After all pressure is released out of pipe 100 through the center of the tool by operation of valve 130, hydraulic pressure may then be applied in such manner as to remove the tool from its engagement with pipe 100. This will normally be after the pipe end has been raised to the barge level for the resumption of pipeline laying operations. Hence, by applying hydraulic pressure on line 115, piston 111 is moved forwardly or to the right as shown in FIG. 8 causing compression flange 112 to move slips 120 forwardly or to the right to the unseated position. This allows split spear 119 to contract away from engagement with the inside surface of section 102 thereby releasing the energy stored in packing rings 125 and 127. At this point, housing 101 may then be removed from the end of pipe 100.

It will thus be observed that this invention provides an improved method and apparatus for laying a pipeline in a body of water and subsequently retrieving the same. When suspension of pipe laying operations is required from time to time due to the weather or other commitments, the present invention provides a method of closing the end of a pipe which does not require welding, as with the prior art devices. This invention provides a pig launcher also that is useful in evacuating fluids from the pipe to thereby make it easier to raise and lower, which pig can be released hydraulically in a matter of a few minutes which greatly reduces the time and cost of suspending pipe laying operations.

It should also be understood that while slips 26, 85, and 120, of the various embodiments are shown and described as having two axially spaced apart camming surfaces, other forms of gripping means may be employed. For example, the slips may be provided with only a single tapered surface, and still act in a fashion in accordance with the teachings of this application to exert the desired gripping effect and remain within the scope of the invention taught herein. Moreover, while the piston means of this invention have been shown as being of an annular type, i.e., pistons 52, 69, and 111, it is to be understood that other forms of piston means can be used. For example, a plurality of individual or discrete pistons operating in individual cylinders could be substituted for the piston means described and still function to actuate and deactuate the tools described. Hence, the term "piston means" is to be construed broadly.

It is also to be understood that the apparatus and method described herein may have many other uses besides such operations as the laying of pipe. For example, the apparatus and method taught herein may be used as a recovery tool for recovering dropped or emergency jetisoned pipeline. Hence, it might be that the apparatus and method used herein can be used as a safety device to prevent sinking of a barge in certain instances.

Further modification and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In apparatus for releasably closing the end of a pipe, the combination comprising:
   a releasable housing arranged for co-axial telescopic mounting with the end of said pipe;
   means supported by said housing for releasably engaging said pipe and holding said housing against axial movement relative thereto;
   seal means supported by said housing and cooperative therewith for releasably engaging and sealing the end of said pipe against fluid flow therethrough;

hydraulic actuating means for effecting movement of said holding means and seal means to said respective engaging position;
   hydraulic release means operably connected to said holding means for positively urging said holding means to the release position therefor, with consequent release of said seal means, whereby said housing can be removed from said pipe;
   and means for applying pressurized hydraulic fluid to said hydraulic activating means and said hydraulic release means for engaging and subsequently disengaging said housing with said pipe.

2. In apparatus for releasably closing the end of a pipe and for raising and lowering the same in a body of water, the combination comprising:
   a housing arranged for generally co-axial telescopic connection to the end portion of said pipe and defining an annular space therebetween;
   fluid actuated releasable gripping means supported by said housing between said housing and said pipe for frictionally lodging between said pipe and said housing upon actuation thereof;
   fluid actuated releasable seal means supported by said housing between said housing and said pipe for sealing the annular space therebetween, said seal means being cooperative with said housing for sealingly closing said pipe end upon actuation thereof;

means for applying fluid pressure to said housing for actuating said gripping means and said seal means;

fluid pressure actuated release means provided in said housing and operably connected to said gripping means for positively urging said gripping means to the release position with consequent release of said seal means, whereby said housing may be removed from said pipe;
   and means connected to said housing for attaching a supporting line thereto, whereby said pipe end may be raised and lowered in said body of water by taking in and paying out said line.

3. The invention as claimed in claim 1 wherein:
said housing includes a portion arranged for insertion into said end of said pipe;
and said engaging and sealing means are mounted on said housing portion for engaging and sealing with the internal surface of said pipe.

4. The invention as claimed in claim 1 wherein:
said housing includes a portion arranged for mounting over the end of said pipe;
and said engaging and sealing means are mounted on said housing portion for engaging and sealing with the external surface of said pipe.

5. The invention as claimed in claim 2 wherein:
said gripping means includes a plurality of slips circumferentially spaced about in the annulus between said housing and said pipe;
and said release means includes a generally tubular piston having an annular flange projecting radially therefrom, said flange being arranged for actuating said slips when said piston is moved in a first axial direction in response to fluid pressure applied thereto, and said flange being arranged for deactuating said slips when said piston is moved in the opposite axial direction in response to another fluid pressure applied thereto.

6. The invention as claimed in claim 2 including:
means connected to said housing for supporting a pipeline pig for launching through said pipe;
and means for applying a pressurized fluid to force said pig from said supporting means and along said pipe to thereby evacuate water or the like from said pipe.

7. In apparatus for releasably closing the end of a pipe and for raising and lowering the same in a body of water, the combination comprising:
a housing arranged for generally co-axial telescopic connection to the end portion of said pipe;
gripping means supported by said housing between said housing and said pipe for frictionally lodging between said pipe and said housing upon actuation thereof;
seal means supported by said housing between said housing and said pipe for sealing the annular space therebetween, said seal means being cooperative with said housing for sealingly closing said pipe end upon actuation thereof;
means supported by said housing for actuating and subsequently deactuating said gripping means and said seal means in response to the application of fluid pressure thereto;
means connected to said housing for attaching a supporting line thereto, whereby said pipe end may be raised and lowered in said body of water by taking in and paying out said line;
said gripping means including a plurality of slips circumferentially spaced about said housing in the the annular space between said housing and said pipe;

said actuating and deactuating means including piston means arranged for movement in opposite axial directions in response to pressurized fluid applied thereto, said piston means being operably connected to said slips;
and said actuating means including a thrust member mounted in said housing and having one end for contacting said seal means and having the other end operatively associated with said piston means, whereby actuation of said piston means in one axial direction causes actuation of said seal and gripping means and actuation of said piston means in the opposite axial direction causes deactuation of said seal and gripping means.

8. The invention as claimed in claim 7 wherein:
said thrust member is provided with an annular inclined camming surface;
and said slips are mounted for engagement with said camming surface for urging to the setting position.

9. The invention as claimed in claim 8 wherein:
said piston means is in the form of an annular piston having a radially extending annular flange attached thereto.

10. In a method for releasably closing the end of a pipeline and lowering and raising the same in a body of water, comprising the steps of:
supporting a releasable housing in generally coaxial telescopic relationship proximate the end portion of said pipe;
supporting releasable pipe gripping means between said housing and said pipe;
supporting releasable seal means between said housing and said pipe, said seal means being cooperative with said housing for closing said pipe end upon actuation thereof;
actuating said gripping and seal means to the gripping and sealing positions by applying a fluid actuated force thereto, whereby said housing is sealingly and frictionally connected to said pipe;
connecting a supporting line to said housing, whereby said pipe end may be lowered and raised in said body of water by paying out and taking in said line;
and deactuating said gripping and seal means by applying another fluid force thereto.

11. The invention as claimed in claim 10 including:

supporting a pipeline pig in said housing;
and applying a pressurized fluid to said housing to propel said pig from said housing and along said pipe, to thereby evacuate water or the like from said pipe.

* * * * *